March 3, 1970     JUN SHIMOMURA ET AL     3,498,193
EXPOSURE METER FOR MEASURING THE ILLUMINATION OF IMAGE AREA
Filed May 18, 1967                        6 Sheets-Sheet 1

United States Patent Office 3,498,193
Patented Mar. 3, 1970

3,498,193
EXPOSURE METER FOR MEASURING THE ILLUMINATION OF IMAGE AREA
Jun Shimomura, Tokyo, Shigeo Ono, Yokohama-shi, and Takashi Kageura, Tokyo, Japan, assignors to Nippon Kogaku K.K., Tokyo, Japan, a Japanese corporation
Filed May 18, 1967, Ser. No. 639,348
Claims priority, application Japan, May 28, 1966, 41/33,872
Int. Cl. G03b 7/02; G01j 1/42
U.S. Cl. 95—10         12 Claims

ABSTRACT OF THE DISCLOSURE

A camera is provided with an exposure meter in which a pair of photoconductors are responsive to the light of an image of a scene. The first photoconductor is operable to vary an electric signal in accordance with the brightness of the whole area of the image and the second photoconductor is operable to vary an electrical signal in accordance with the brightness of the partial area of the image. Switching means operable from outside of the camera is provided for selectively connecting either or both of said two photoconductors to electrically actuated means having an indicator. Compensation means are provided for correcting the alternation of the current flowing in the electrically actuated means in accordance with the operation of the switching means, so as to maintain the output of the exposure meter unchanged for the image of whole area during the time the switching means is operated.

---

Among the conventional exposure meters for measuring the amount of light rays having passed through the lens of a camera, there have been known the exposure meters of following two types. Namely, the first of the two conventional exposure meter is the one which averages the illumination of the whole image area, and the second of the two is an exposure meter according to which a part of the illumination of the image area is measured. In addition to the above two types of exposure meters, there has been known an exposure meter of such a type (which is not a system to measure the amount of the light rays having passed through a camera lens), that the average or weighted average of the amount of the light rays coming from the range of the angle smaller than the angle of view of the camera lens, and the amount of the light rays coming from the range of the angle a little larger than or equal to the angle of view of the camera lens, is measured.

The conventional exposure meters which are given above, have respectively good points, but at the same time they have drawbacks. The first exposure of photometry of the average of the whole image area is adapted for most of the objects which laymen take picture of, and it is not necessary for them to pay any special consideration at the time when the exposure is measured, and therefore the exposure meter of this system is most generally employed.

However, the exposure of this system is not appropriate in case the brightnesses of the main object and the background are remarkably different. The second exposure meter of partial photometry can give the most correct exposure value when appropriate consideration is paid thereto, but the handling thereof is complicated, and the exposure meter of the second type of system is not appropriate to be used by laymen. The third exposure of weighted average measurement type is an improvement of the first system, and the handling thereof is simple, but it is not appropriate when a special object such as the moon is photographed, and it is impossible to carry out the correct measurement of exposure unless partial photometry is employed.

Therefore, an object of the present invention is to present such an exposure meter which can switch over to any of said three systems, and can select the most appropriate method for measuring the illumination of the object in accordance with the kind of the object to be photographed.

Another object of the present invention is to automatically carry out the necessary correction of the exposure adjusting means in carrying out the switching operation.

A further object of the present invention is to provide an exposure meter which has structure adapted to be built in a single lens reflex camera and in particular, to provide such a device that the measurement of the illumination of the object can be carried out simply without removing the necessity to elevate the sensitivity of partial photometry by means of amplification at the time when weighted average measurement is carried out.

The above and other objects and features of the present invention are more apparent from the following description referring to the embodiments shown in the drawing in which.

Figure 1:
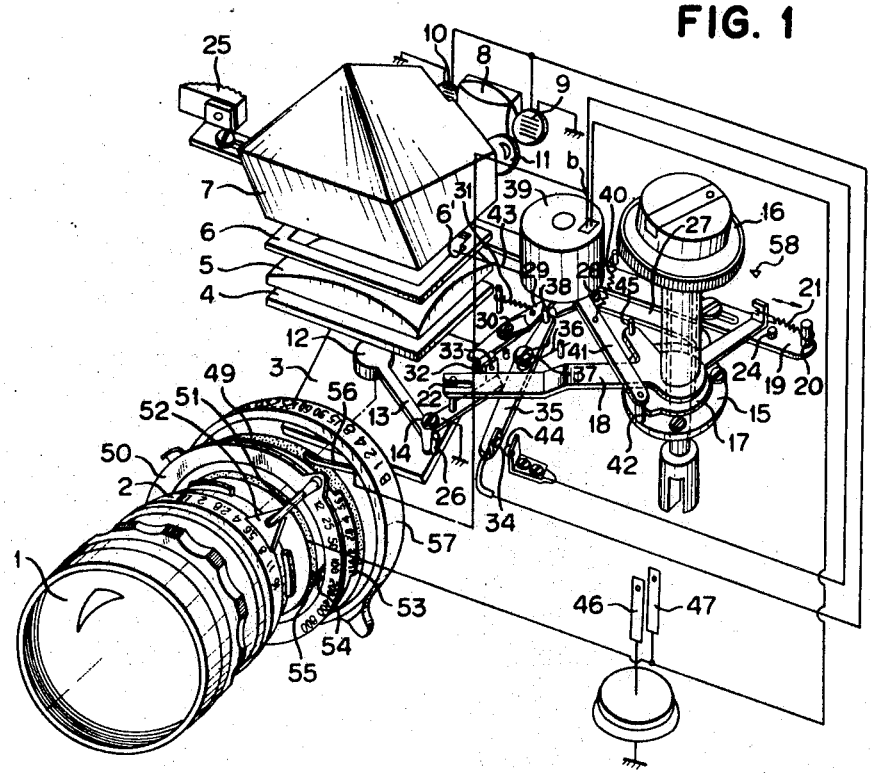
FIG. 1 is an exploded perspective view of an embodiment of the present invention.
Figure 2:
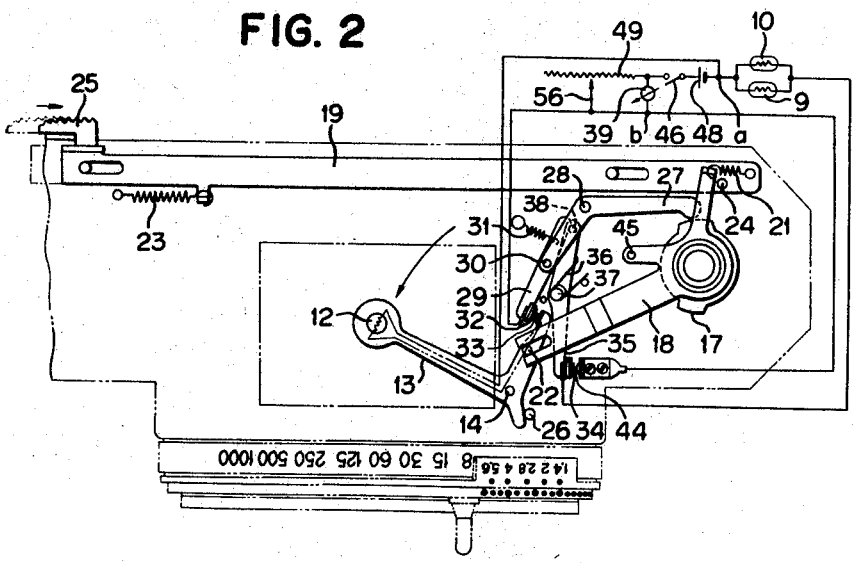
FIG. 2 is a fragmentary and partially schematic plan view of the indicator of FIG. 1.

In FIGS. 1 and 2, 1 is an exchangeable camera lens, having and stopping means (not shown provided inside thereof. When the stopping ring 2 is rotated, the stopping aperture is changed. 3 is a rockable reflecting mirror, 4 is a focussing plate, 5 is a condenser lens, 6 is a finder view frame, 7 is an erect Penta prism, and 8 is an eye-piece lens,. These last mentioned components constitute the finder of a single lens reflex camera. Elements 9 and 10 are the photoconductors such as CdS fixed on both sides of the finder light path on the side of the eye-piece of said erect Penta prism 7. The respective light receiving surfaces are determined so as to have the conjugate positions with the surface of the focussing plate 4 against the lenses 11 (one of which is not shown in the diagram), respectively. In addition, the focussing plate 4 has a dispersing properly, the illumination on the photoconductors 9 and 10 being proportional approximately to the illumination on the whole area of the focussing plate (image area). Element 12 is the third photoconductive piece, and is fixed at the end of the lever 13 which rotates round the shaft 14. Element 15 is a bearing for the film rewinding shaft and is fixed to the camera body; 16 is a switching dial having a cam 17 formed at the lower end thereof, and is rotatably supported by means of the bearing 15; 18 is a lever rotatable around said dial 16, and one end thereof is elastically connected by means of a spring 21 onto the pin 20 on the interlocking plate 19 provided slidably in the direction as is shown by an arrow in FIG. 1 against the body, and the other end thereof is formed in a two-branched fork, and is engaged with the pin 22 on the lever 13. The interlocking plate 19 is urged by the spring 23 (see FIG. 2) so as to have another pin 24 positioned on the upper surface of said interlocking plate 19 rotated in the counterclockwise direction; and 25 is a knob exposed outside of the camera body, and is formed unitedly along with the interlocking plate 19.

FIG. 1 and FIG. 2 show the state wherein said knob 25 is pushed to rotate the lever 18 in the clockwise direction, and the photoconductor piece 12 is pushed directly below the center of the focusing plate 4. Element 26 is a pin for determining the position of the photoconductor piece 12, and 27 is a lever which is rotatably supported by the shaft 28, and one end thereof is connected to the cam 17, and the other end thereof supports the lever 29 by shaft 30 in such a manner that said lever 29 can move freely. One end of said lever 29 is rotated in the counterclockwise direction by means of a spring 31 which is fixed on the body, and the contact 32 is provided insulatingly on the other end of said lever 29. When the photoconductor piece 12 is at the predetermined position within the finder light path, the contact 32 contacts against the contact 33 provided at the other end of the lever 13. Element 35 is a lever having the contact 34 which is insulatingly provided at one end of said lever 35, which is rotatably supported by the shaft 37 provided on the body and is always rotated in the counterclockwise direction. The pin 38 which is provided on the other end of the lever 35 contacts the lever 29. Element 39 is an indicator of the exposure meter, and is mounted so as to rotate the same relative to the body, and is always rotated in the counterclockwise direction by means of a spring 40. Member 42 is a pin which is provided on an arm 41 which is united to said indicator 39, and contacts to the cam 17; the free end of the pointer 43 of the indicator 39 projects within the finder light path, and the cut 6' of the view frame 6 becomes the indicator thereof. Component 44 is a contact which is fixed onto the body through the insulating material, and faces against the contact 34. Member 45 is a pin provided on said lever 18, and when the knob 25 is turned back to the original position (the position indicated by the dotted line of FIG. 2) by means of the spring 23, said pin 45 abuts the indicator arm 41 in place of said cam 17, and the standard position of the indicator 39 is determined. Elements 46 and 47 constitute the operation switch of the exposure meter circuit, 48 is an electric source battery, and 49 is a slidable resistance and is provided in the form of a cylinder on the calculating ring 53 which is described hereinafter.

Element 50 is a interlocking ring which is rotatably provided in front of the camera body and the pin 51 which is unitedly provided along with said interlocking ring 50, is fitted to the slotted tab 52 on the stopping ring 2 on the side of the lens, and transmits the rotation of the stopping ring 2 to the interlocking ring 50. However, in case the lens is removed, the fitting thereof is released. The calculating ring 53 is connected to the interlocking ring 50 so as to optionally change the relative position thereof by means of click stop or such like joints. Component 54 is a contact piece which is connected to one end of said moving resistance 49, and is always contacted to the conductor 55 which is fixed on the body. Member 56 is a moving brush which is contacted against said slidable resistance 49, and is interlocked to the shutter time setting ring 57. The film sensitivity scale is formed on a part of the interlocking ring 50, and said film sensitivity scale faces against the open aperture ratio scale of the mounted lens which is provided on the calculating ring 53. The reason for this is that it is necessary to carry out the correction as the illumination on the photoconductor is changed against the object of the same brightness when the open aperture ratio of the mounted lens is changed at the time when the amount of the incident light is measured through the lens which is in the open state. Thus, the value of said moving resistance 49 is obtained as a function of the shutter time, stopping value, the film sensitivity and the open aperture ratio of the mounted lens, and therefore the structure of the resistance 49 is adjusted in advance so that the proper exposure can be obtained when the current passing through the indicator 39 becomes a certain value, i.e., when the hand 43 agrees with the center of the indicator 6'.

The following are the detailed explanations about the functions thereof, and first of all, the notation S of the switching dial 16 is adjusted to accord with the indicator 58, and the lever 27 and the pin 42 are respectively faced against the portion of larger diameter of the cam 17 to rotate the indicator 39 and the lever 29 to the positions as are shown in FIG. 1 and FIG. 2. When the knob 25 is pushed to the right side in the drawing, the lever 18 is pulled by the spring 21 to be rotated in the clockwise direction as is shown by FIG. 1 and FIG. 2, and the lever 13 is rotated to the position through the pin 22 as is shown in the diagrams, and the third photoconductor piece 12 is inserted into the finder light path right below the center of the focussing plate 4. At this time, the contacts 32 and 33 are contacted with the inserting operation but the other contacts 34 and 44 are separated because the lever 29 pushes the other lever 35 in the clockwise direction through the pin 38. Therefore, when the exposure meter circuit is arranged as is shown in FIG. 1 and FIG. 2, the third photoconductor piece 12 alone is connected insofar as Point a (said Point a is the earth in FIG. 1) and Point b are concerned, and the indicator 39 measures the illumination of a part of the finder image area. In other words, partial photometry can be done.

And, when a finder is departed from the knob 25, the interlocking plate 19 is moved to the left side by means of the spring 23, and rotates the lever 18 in the counterclockwise direction through the pin 24. Therefore, the lever 13 is rotated in the clockwise direction and escapes from the finder light path. At this time, one of the groups of contacts 32 and 33 are separated, and at the time of said operation, the lever 29 is rotated more or less in the counterclockwise direction, and therefore the other lever 35 is rotated in the same direction by the spring 36, and the other group of contacts 34 and 44 are contacted. Therefore, the photoconductors 9 and 10 are connected in parallel to the indicator 39 with respect to the Point a and Point b, and the indicator 39 measures the illumination of the whole finder image area. Namely, whole image area photometry can be carried out.

In addition, it is possible to adjust the resistivity obtained by connecting the photoconductors 9 and 10 in parallel and the resistivity of the third photoconductor piece 12 to be almost equal against the objects of the same brightness. Therefore the standard position of the indicator 39 can be the same position in case either of the systems is employed.

When the notation B of the switching dial 16 agrees with the indication 58, the lever 27 and the pin 42 are faced against the portion of smaller diameter of the cam 17, and when the knob 25 is on the original position (the position shown by the dotted line of FIG. 2), the pin 45 provided on the lever 18 is contacted against the indicator arm 41. Therefore the indicator 39 is placed at the position as if said pin 42 were faced against the portion of larger diameter of the cam 17, and in addition to that, the lever 13 escapes from the finder light path perfectly to separate one of the groups of contacts 32 and 33, and to contact the other group of contact 34 and 44 through the lever 29. In this case too, the indicator 39 measures the average illumination of the whole image area. In other words, when the knob 25 is not pushed to the right, the whole image area photometry can be carried out regardless of the notation of the switching dial 16.

Next, when the knob 25 is pushed to the right in said state, the lever 18 is rotated in the clockwise direction so that the third photoconductor 12 is, as previously explained, inserted into the finder light path, and at the same time one of the groups of contacts 32 and 33 are contacted. At this time, the lever 27 is faced against the portion of smaller diameter of the cam 17, and therefore, the position of the supporting shaft 30 of the lever 29 is moved in the clockwise direction more or less from the position as is shown in the diagram. Accordingly the other group of contacts 34 and 44 remains to be contacted, and therefore all the photoconductors 9, 10 and 12 are connected in parallel to the indicator 39, and the weighted average illumination of the whole image area and a part thereof is measured.

In this case the composite resistivity of the photoconductors 9, 10 and 12 becomes almost half of the resistivity of the respective measuring types above described, and therefore, it is necessary to carry out some correction. In accordance with the system of the so called fixed point-agreement system which is given as above as an embodiment, the value $R_p$ of the slidable resistance 49 can be determined from the following formula;

$$R_p = i_g R R_g / [E - i_g (R + R_g)] \quad (I)$$

In the above formula, E stands for electric source voltage $i_g$ stands for fixed electric current, R stands for the resistance of the photoconductor and $R_g$ stands for the internal resistance of the indicator.

In accordance with the respective methods for measuring the illumination when the electric current $i_g'$ passing through the indicator is calculated in such a state wherein $R_p$ is adjusted so that $i_g$ becomes the predetermined value, all the photoconductors 9, 10 and 12 are connected in parallel and the composite resistance thereof becomes $kR$, as follows;

$$i_g' = E R_p / [k R R_g + R_p (kR + R_g)]$$

This is substituted in the Formula 1

$$i_g' = E i_g / [kE + (1-k) i_g \cdot R_g] \quad (II)$$

In the right side of the equation there is no variable, and $i_g'$ is understood to be constant.

R is not contained in the Formula II and therefore the relation of $i_g'$ is equal to $Ci_g$ against any kind of brightness, and from this the following method for correction can be considered.

(a) The indicator itself is rotated to change the standard position, or the position of the indicator is changed against the pointer of the indicator;

(b) The shunt circuit is provided on the indicator to carry out the switching;

(c) The voltage of the electric source is switched to change; and (d) Bridge circuit is employed.

FIG. 1 shows where the correction is carried out by means of the method of (a), by which the lever 18 is rotated and the indicator 39 is rotated by means of the spring 40 till the pin 42 on the arm 41 is contacted against the portion of the smaller diameter of the cam 17, and the predetermined correction is carried out.

Figure 3:
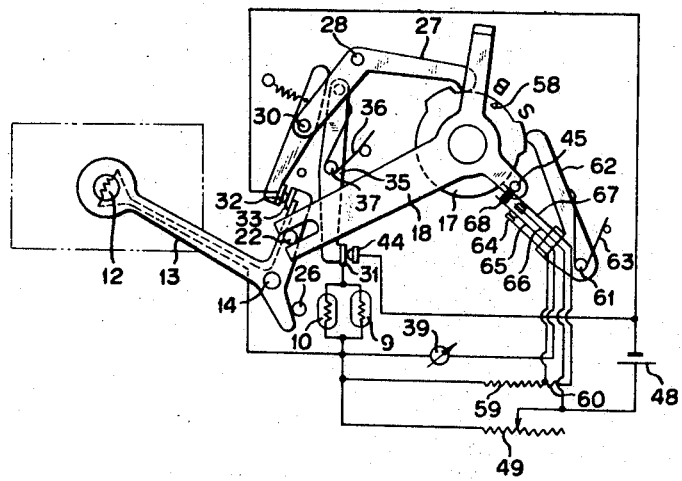
FIG. 3 to FIG. 12 are fragmentary and partially schematic plan views showing the main portion of other embodiments of the present invention.

FIG. 3 is an embodiment in which the correction is carried out in accordance with the method (b), and the shunt resistance 59 is provided on the indicator 39, and $(C-1)i_g$ is passed through the shunt circuit, and the current passing through the indicator 39 is kept constant. The resistivity $R'$ of the correction resistance 60 can be determined in the following manner.

$$R' = \frac{R^2_g}{R_g + R'_p}$$

In the above formula, $R'_p$ is the resistivity of the resistance 59. The lever 62 which is rotated around the supporting shaft 61 fixed on the camera body is rotated in the counterclockwise direction by means of the spring 63, and is contacted against the cam 17. The contact pieces 64, 65, 66, and 67 are insulatingly provided on the lever 62, and the long contact pieces 65 and 67 are provided so as to be moved by means of the insulated projection 68. Therefore the two intermediate contact pieces 65 and 66 provided between them are contacted in the free state, and when the contact piece 67 is pushed by the pin 45, the contact pieces 67 and 66, 65 and 64 are respectively contacted. FIG. 3 shows the state wherein the weighted average photometry is carried out by means of the photoconductors 9, 10 and 12, and the contact pieces 64 and 65 and 66 and 67 are respectively contacted and the shunt circuit of the indicator 39 is formed. The shunt circuit is cut off as the contact pieces 65 and 66 are contacted because the pin 45 escapes in the counterclockwise direction when the lever 18 is at the position wherein it cannot be operated by the knob 25.

When the indicator 58 (the relation of the indicator and the notation opposite when compared with the embodiment of FIG. 1) is adjusted to be on the notation S by rotating the cam 17, the end of the lever 62 falls into the portion of the smaller diameter of the cam 17, and therefore, the respective contacts 64 to 67 are turned back to the free positions. Accordingly, in the above described state, even if the lever 18 is operated, the pin 45 does not push the long contact piece 67, and the shunt circuit remains to be cut off.

Figure 4:
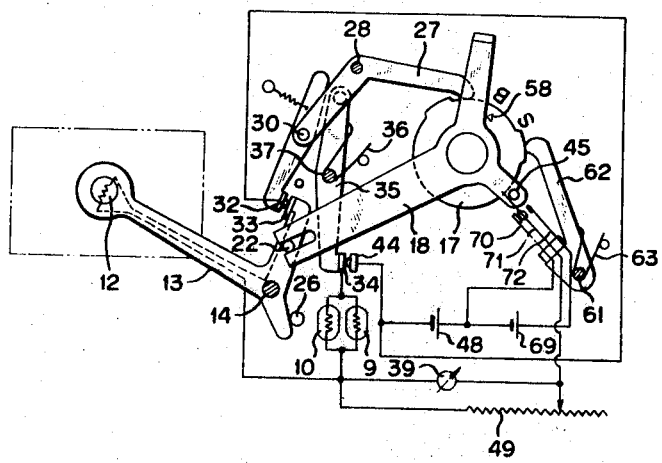

FIG. 4 shows an embodiment wherein the method of (c) is employed, and the mechanical structure thereof is almost the same as that of FIG. 3. In FIG. 4, 48 and 69 are the electric source batteries, and when the whole photometry or partial photometry alone is carried out, the two batteries are used in a series. In case the weighted average photometry is carried out only one of them 48 is used, and for these purposes the voltage is predetermined. The contact pieces 70, 71 and 72 are insulatingly provided on the lever 62, and when the photoconductors 9, 10 and 12 are connected in parallel, i.e., when the lever 18 is rotated by means of the pushing operation of the knob 25, the contact pieces 70 and 71 are contacted, and the shunt circuit is formed.

When the shunt voltage is presumed to be $E'$ and the current which passes through the indicator at this time is presumed to be $i_g''$, the following formula can be obtained.

$$i_g'' = \frac{E' R_p}{k R R_g + R_p (kR + R_g)}$$

When the Formula I is substituted in this, the following result can be obtained;

$$i_g'' = \frac{E' i_g}{kE + (1-k) i_g \cdot R_g}$$

In order to attain the relation of $i_g'' = i_g$, i.e., in order to carry out the correction, the following relation must be satisfied;

$$E' = kE + (1-k) i_g \cdot R_g \quad (III)$$

In such a circuit as is shown in FIG. 4, in the case of the minimum brightness which is the limit of measurement, R is about 100 $k\Omega$, and $R_p$ is generally $\infty$ or in the neighbourhood thereof, $R_g$ is several $k\Omega$, and therefore the following relation of $E \gg i_g R_g$ is considered. Therefore, $E' \doteq kE$ and in case $k$ is equal to ½, $E'$ becomes ½ and 48 and 69 can be the batteries of the same kind, and the construction becomes simple.

Figure 5:
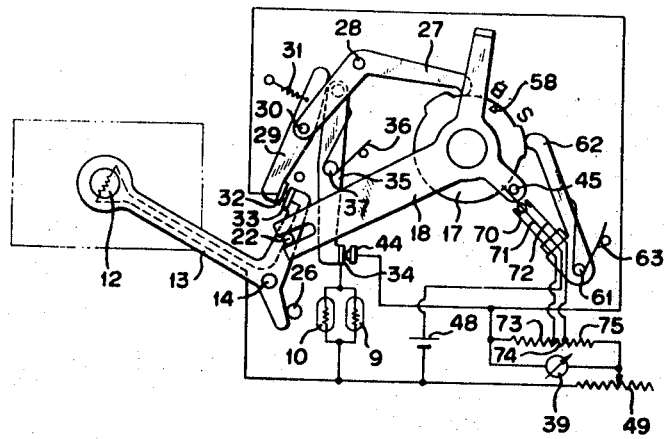

FIG. 5 shows an embodiment wherein the method (d) is employed, and in regard to the mechanical structure thereof is exactly the same as in the case of FIG. 4. However, in this embodiment, the bridge circuit is formed by means of the photoconductors 9, 10, or 12, or by means of said photoconductors 9, 10 and 12 and the resistances 49, 73, 74 and 75. Only when the photoconductors 9, 10 and 12 are connected parallel, the sides thereof are formed by the resistances 74 and 75 and in other cases, the sides of the photoconductors 9, 10, or 12 have the resistance 75 alone, and the opposite side of the moving resistance 49 becomes the resistances 73 and 74. Therefore in case it is presumed that the composite resistivity of the photoconductors 9 and 10 or the resistivity of the photoconductor 12 is R, and the resistivities of the resistances 49, 73, 74 and 75 are respectively $R_p$, $R_1$, $R_2$ and $R_3$, when the photoconductors 9, 10 and 12 are connected in parallel, $R/R_p = 2R_1/(R_2+R_3)$ is the condition of equilibrium.

Therefore $R_1$, $R_2$, and $R_3$ are determined so as to satisfy the following condition;

$$2R_1/(R_2+R_3) = (R_1+R_2)/R_3$$

$$\therefore R_1 : R_2 : R_3 = 2 : 1 : 3$$

FIG. 6 through FIG. 9 are the embodiments wherein the weighted average photometry is carried out, and the photoconductors 9 and 10 are connected in series to the photoconductor 12, and as the method for correcting the change of R, the above given four methods can be used.

Figure 6:
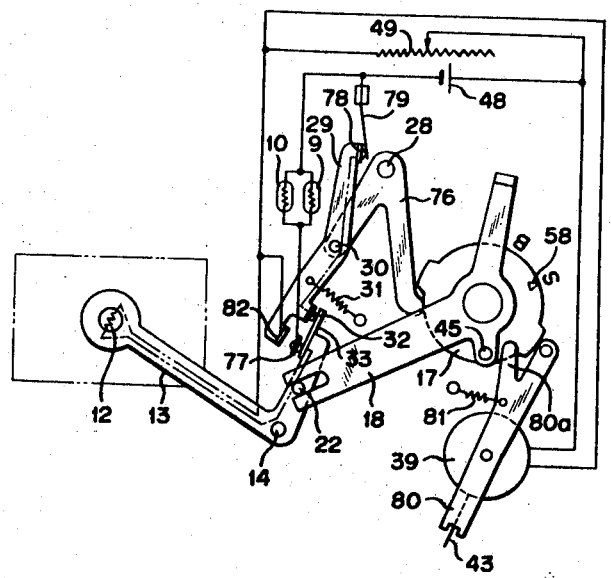

FIG. 6 is an embodiment wherein the correction is carried out by moving the indication 80 of the indicator (corresponding to 6' of FIG. 1). The lever 29 is supported by 30 on the lever 76 (corresponding to the lever 27 of FIG. 1) provided around the rotating shaft 28, and is rotated in the counterclock wise direction by means of the spring 31, and therefore one end of the lever 76 is contacted to the cam 17.

When the lever 18 is brought to the position for operation by pushing the knob 25, the photoconductor 12 is projected in the center of the finder view, and one end of the contact piece 33 is contacted against the contact 77 which is fixed on the camera body. Contact 32 on the lever 29 is pushed by the other end of the contact piece 33, and therefore the contact 78 provided at the other end of the lever 29 is contacted against the elastic contact piece 79 fixed on the camera body. In the state as is shown in FIG. 6 the photoconductor 12 alone participates in the measurement of exposure. At this time, the indication 80 is rotated in the counterclockwise direction by means of the spring 81, and is fitted to the cam 17. In case the lever 18 is in such a position that it cannot be operated the contact 82 is contacted against the contact 77, and the pieces 32 and 33 are opened and the photoconductors 9 and 10 participates in the measurement. The pin 45 is rotated in the counterclockwise direction, but is adjusted to stop at the position where said pin 45 is contacted against one arm 80a of the indication 80, and therefore the indication 80 is not moved.

When the indication 58 is adjusted to agree with the notation B by rotating the cam 17, the end of the lever 76 is faced against the portion of greater radius of the cam 17, and is rotated a little in the clockwise direction. The contacts 77 and 82 remain as they are contacted. The contact pieces 32 and 33 and the contact pieces 78 and 79 remain as they are opened, and the arm 80a remains as it is contacted against the pin 45. When the lever 18 is operated, the support 30 is moved to the right side, and therefore the contact piece 33 pushes the contact 32, and the contact pieces 78 and 79 remain opened even if the lever 29 is rotated in the clockwise direction. Accordingly, the photoconductors 9, 10 and 12 are connected in series, and the composite resistivity becomes almost 2R. At this time, the pin 45 is rotated in the clockwise direction and 80a follows the same and therefore the indication 80 moves to continuously correct it.

Figure 7:
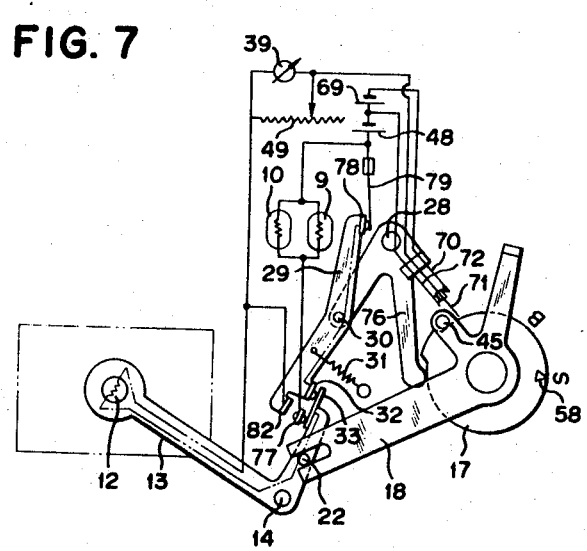

FIG. 7 is an embodiment of the correcting method by means of partial pressure. The contact pieces 70, 71 and 72 are provided on the lever 76, and the indication 58 of the cam 17 is adjusted in accordance with the notation B. Only when the lever 18 is operated are the contact pieces 70 and 71 closed. In other cases the contacts 66 and 67 are closed, and the function of partial pressure in this case is the same as in the case of the embodiment of FIG. 4, and the mechanical operation thereof is the same as in the case of the embodiment of FIG. 6, and therefore the explanation is omitted.

Figure 8:
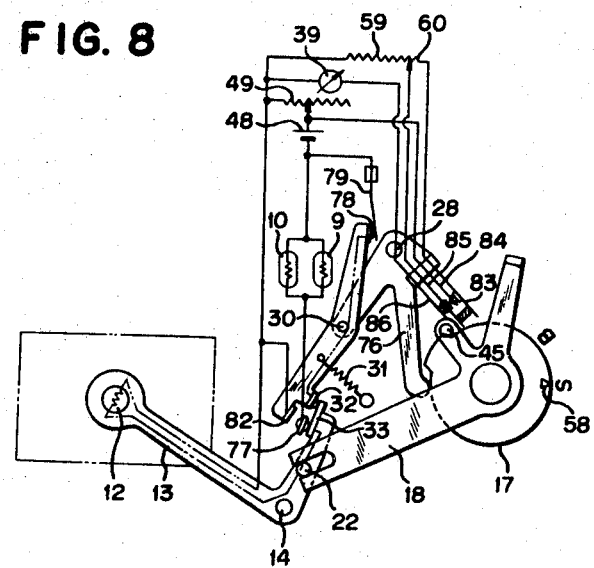

FIG. 8 is an embodiment of the correcting method by means of shunt current. Only when the photoconductors 9, 10 and 12 are connected in series are the contact pieces 85 and 86, which are insulatingly provided on the lever 76, contacted to cut off the shunt circuit. In other cases the contacts 83 and 84, and 85 and 86 are respectively contacted to form the shunt circuit. In regard to the shunt effect at this time, the same shunt effect can be observed as in the case of the embodiment of FIG. 3 and the mechanical operation is the same as in the case of FIG. 7, and therefore the explanations about the effect are omitted.

Figure 9:
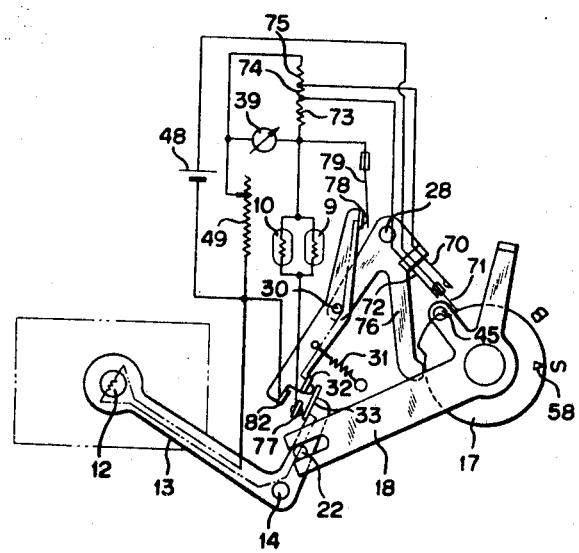

FIG. 9 is an embodiment wherein it is corrected by making use of a bridge circuit and the bridge circuit is composed of the respective photoconductors 9, 10 or 12 or said photoconductors 9, 10 and 12 and the resistances 49, 73, 74 and 75. Only when the photoconductors 9, 10 and 12 are connected in series, the opposite side thereof is constituted by the resistance 75, and in other cases, the opposite sides of the photoconductors 9, 10 or 12 become the resistances 74 and 75. In regard to the conditions to determine the resistivity of the resistances 73, 74 and 75, they are exactly the same as in the case of FIG. 5 and the mechanical operations are almost the same as in the embodiment of FIG. 7, and therefore the explanations about the operation are omitted.

Figure 10:
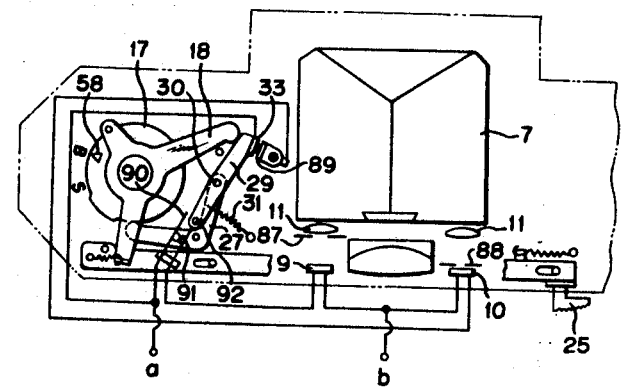

In accordance with the embodiment of FIG. 10, opening stop 87 is provided right behind one of the lenses 11 and the view stop 88 is provided right in front of the other photoconductor 10. Accordingly, the resistivity of the photoconductor 10 becomes the function of the illumination of the center of the image area, but since it is preferable for carrying out the weighted average photometry, or switching operation that it is the same with the photoconductor 9 having the resistance which becomes the function of the whole photometry against the object of a certain brightness, it is adjusted by the opening stop 87. FIG. 10 shows the state wherein the knob 25 is moved to the left, and the lever 18 is rotated in the clockwise direction to push the lever 29 against the spring 31 and the contact 33 and the contact 89 which is fixed on the camera body are contacted. The contact pieces 90 and 91 are normally contacted, and therefore the photoconductors 9 and 10 are connected in parallel in regard to Point a and Point b. Next, when the indication 58 of the cam 17 agrees with the notation S, the lever 27 is faced against the portion of larger radius of the cam 17 and is rotated in the counterclockwise direction and the rotating shaft 30 of the lever 29 is also moved to the left. And in this state, when the knob 25 is operated, the contacts 33 and 89 are contacted. When the lever 29 is slightly rotated in the clockwise direction, the pin 92 pushes the contact piece 90, and therefore the interval between the contact pieces 90 and 91, is enlarged. Namely, the photoconductor 10 alone is connected to Point a and Point b. At the position where the knob 25 is not operated, the contact pieces 33 and 89 are always opened, and the contacts 90 and 91 are closed, and therefore the photoconductor 9 alone is contacted with respect of Points a and b. The method for correcting the changes of resistance at the time when the photoconductors 9 and 10 are connected in parallel is the same as in the preceding case.

Figure 11:
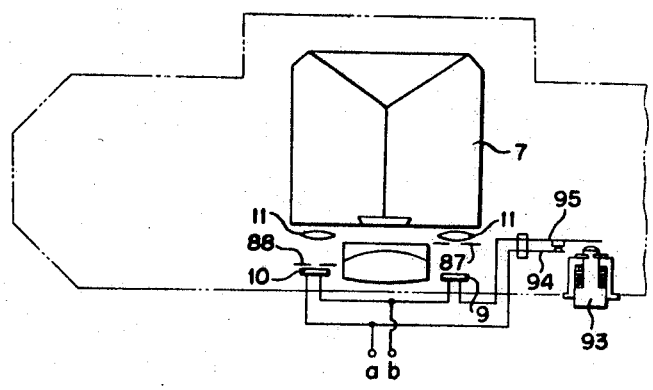

When the knob 25 is not operated at the time when the photoconductor appears within the finder view, it is preferable that it should automatically go out of the view. However, when it is not necessary that the photoconductor should appear with the view, it is possible to carry out the switching method as is shown in FIG. 11. In other words, when the button 93 is pushed, the contact pieces 94 and 95 are opened, and the photoconductor 10 alone is connected to Point a and Point b, and when the button 93 is not operated the photoconductors 9 and 10 are connected in parallel. Namely, the partial photometry which is regarded to be a special photometry is carried out during the time when the button is being pushed, and when the button is not pushed the weighted average photometry, which is almost the same as with the whole image area photometry that laymen are most apt to take picture of, is carried out.

At this time, the correction is carried out in the same manner as in the above described methods.

Figure 12:
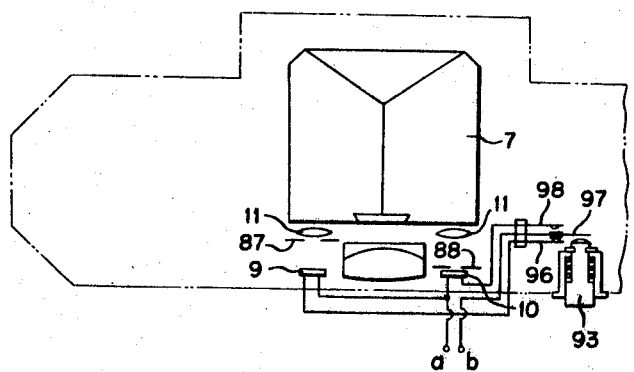

In accordance with the embodiment of FIG. 12, the contact pieces 96 and 97 are contacted when the button 93 is not operated, and the photoconductor 9 is connected with respect to Point a and Point b. In case the button 93 is operated, the contact pieces 97 and 98 are contacted, and the photoconductor 10 is connected with respect to Point a and Point b. In this case, the partial photometry and the whole image photometry are switched over from one to the other, and correction is not required. This is accounted to be an advantage, and in addition to that, the method for indicating the proper exposure is not restricted to the fixed point-agreement system. Also, the opening stop 87 can be omitted. However, in such a case as to omit the opening stop, correction is required.

Further, it is a matter of course that the light receiving portion for the photometry for measuring the illumination of the whole image area (9 and 10 in the embodiments shown in the drawing) and the light receiving portion for the partial photometry for measuring the illumination of a part of the image area, may be composed of a plural number of photoconductors or single photoconductor.

In regard to the light receiving portions as mentioned above, such light receiving portions are sufficient if only the illumination of the predetermined image area can be measured. Therefore, it is not restricted to the image forming surface of the objective lens (the camera lens in the embodiments of the drawing) or to the conjugated surface, but it can be placed at the position where the light rays from said surfaces can be received by means of the member having directionality.

In accordance with the embodiments as are shown in the attached drawing, it is so devised that it is not necessary to correct the indicated values at the time of switching operation from the partial photometry to the whole photometry and vice versa. The present invention is not restricted to such embodiments alone, but an embodiment of the present invention can be such that it requires correction. In this case, in accordance with the methods for correction from (a) to (d) as mentioned above, that the correction can be carried out by using a bridge circuit by changing the position of indication of the pointer or the indicator itself, or by providing shunt circuit, or by changing the voltage of electric source or by using a bridge circuit. Therefore in such cases, it is necessary to simultaneously carry out the correction for compensating the switching operation from the partial photometry to the whole photometry and vice versa, and the correction for compensating the switching operation from these photometries to weighted average photometry and vice versa.

As mentioned above, when the present invention is employed, (1) It is possible to select the best photometry adapted for the specific kind of the object;

(2) It is easy to carry out photometry since the required correction can be carried out automatically in carrying out said switching operations;

(3) It is so devised that when the knob or button is operated, the partial photometry or weighted average photometry is carried out, and when the knob or button is not operated, more general weighted average photometry or the whole image area photometry is carried out, and therefore even laymen scarcely make mistakes;

(4) In accordance with the embodiments having the structure as are shown in FIG. 1 to FIG. 9, the illumination of the photoconductor for measuring the partial illumination is sufficiently great, and therefore it is possible to carry out sharp partial photometry, and it is not necessary to amplify at the time when weighted average photometry is carried out, and it is not necessary either to carry out correction at the time when the switching operation between the partial photometry and the whole image area photometry; and (5) In accordance with the embodiments having the structures as are shown in FIG. 1 to FIG. 9, when a specific use is required, the photoconductor appears within the finder light path directly, and therefore the user can know the proper exposure correctly, and in FIG. 2, when a red transparent plate is provided on the extended portion from the lever 35, it is possible to have said red transparent plate projected within the finder light path when the more specific partial photometry is carried out, and the exposure can be more correctly obtained.

The present invention can be applied to the exposure meter of such a type according to which photometry can be conducted by stopping down the diaphragm of a camera lens.

What is claimed is:

1. A camera having an exposure meter comprising, in combination:
    an objective lens for forming an image of a scene to be photographed,
    a pair of means responsive to the light of said image, the first light responsive means being operable to vary an electric signal in accordance with the brightness of the whole area of said image, and the second light responsive means being operable to vary an electrical signal in accordance with the brightness of the partial area of said image;
    an electrically actuated unit having an indicator operable by said light responsive means;
    switching means operable from the outside of the camera selectively connecting either or both of said two light responsive means to said electrically actuated unit; and
    means for compensating the alteration of the current flowing through said electrically actuated unit in accordance with the operation of said switching means, whereby the output of the exposure meter is not changed for the image of whole area having a uniform brightness, during the operation of said switching means.

2. A camera according to claim 1, wherein said switching means is engaged with said compensating means for mechanically moving said electrically actuated unit thereby compensating said alteration of the current.

3. A camera according to claim 1, wherein said compensating means includes two resistors provided in the exposure measuring circuit and respectively connected to said electrically actuated unit, whereby said resistors are selectively connected to the exposure measuring circuit by said switching means to electrically compensate the alteration of the current.

4. A camera according to claim 1, wherein said two light responsive means are photoconductors, and said compensating means includes a plurality of compensation electric sources in the exposure measuring circuit, whereby said electric sources are adapted to be selectively switched by said switching means so that the source voltage is changed to compensate for said alteration of the current.

5. A camera according to claim 1, further comprising, selection means operable from the outside of the camera for selecting the connection of said two light-responsive means to said electrically actuated unit, said selection means being movable between two positions, each of said light responsive means being connected selectively by said switching means when said selection means is located at one position, and when at the other position, either one or both of said responsive means being connected selectively by said switching means.

6. A camera according to claim 1, wherein said compensating means includes a movable index and said switching means is engaged with said compensating means for mechanically moving said index so as to coincide said indicator and said index to thereby compensate said alteration of the current.

7. A camera according to claim 6 wherein said resistors are connected in parallel to said electrically actuated unit.

8. A camera according to claim 6 wherein said resistors are connected in series to said electrically actuated unit.

9. An exposure meter for measuring the intensity of light rays that have passed through the objective lens, said exposure meter comprising:

an electrical unit which includes an indicator,
first photoconductive means responsive to the brightness of the whole area to be photographed;
second photoconductive means responsive to the brightness of the partial area to be photographed;
switching means operable from the outside of the camera for selectively connecting either or both of said first and second photoconductor means to said electrical unit;
means for compensating for the alteration of the current flowing through said electrically actuated unit in accordance with the operation of said switching means;
bias means for biasing said switching means to its rest position at which position said first photosensitive resistor is connected to said electrical unit; and
selection means for selectively connecting either said second photoconductive means or both of said first and second photoconductive means to said electrical unit when said switching means is operated.

10. An exposure meter for measuring the intensity of light rays that have passed through the objective lens of a camera, said exposure meter comprising:
an electrical unit which includes an indicator, first photoconductive means responsive to the brightness of the whole area to be photographed and second photoconductive means responsive to the brightness of the partial area to be photographed,
switching means operable from the outside of the camera for disconnecting said second photoconductive means from said electrical unit; and
means for compensating for the alteration of the current flowing through said electrically actuated unit in accordance with the operation of said switching means.

11. An exposure meter for measuring the intensity of light rays that have passed through the objective lens of a camera, said exposure meter comprising:
an electrical unit which includes an indicator, first photoconductive means responsive to the brightness of the whole area to be photographed and second photoconductive means responsive to the brightness of the partial area to be photographed;
switching means operable from the outside of the camera for disconnecting said second photoconductive means from said electrical unit;
means for compensating for the alteration of the current flowing through said electrically actuated unit in accordance with the operation of said switching means; and
bias means for biasing said switching means toward its unoperated position.

12. An exposure meter for measuring the intensity of light rays that have passed through the objective lens of a camera, said exposure meter comprising:
an electrical unit which includes an indicator;
first photoconductive means responsive to the brightness of the whole area to be photographed;
second photoconductive means responsive to the brightness of the partial area to be photographed;
switching means operable from the outside of the camera for connecting either said first or said second photoconductive means to said electrical unit selectively; and
bias means for biasing said switching means from its operated position where said second photoconductive means is connected to said electrical unit to its rest position where said first photoconductive means is connected to said electrical unit.

References Cited
UNITED STATES PATENTS

| | | | |
|---|---|---|---|
| 3,080,803 | 3/1963 | Uno | 95—42 XR |
| 3,100,429 | 8/1963 | Koch. | |
| 3,163,097 | 12/1964 | Zenyosi et al. | 95—42 XR |
| 3,264,964 | 8/1966 | Ebertz | 95—42 |
| 3,291,017 | 12/1966 | Steisslinger | 95—42 XR |
| 3,324,776 | 6/1967 | Matsumoto | 95—42 XR |
| 3,327,600 | 6/1967 | Trankner | 95—42 |

FOREIGN PATENTS

| | | |
|---|---|---|
| 1,128,983 | 9/1956 | France. |
| 1,419,387 | 10/1965 | France. |

NORTON ANSHER, Primary Examiner

J. F. PETERS, Jr., Assistant Examiner

U.S. Cl. X.R.

95—42; 356—222